US008472655B2

(12) United States Patent
Srinivasan et al.

(10) Patent No.: US 8,472,655 B2
(45) Date of Patent: Jun. 25, 2013

(54) AUDIO PROCESSING

(75) Inventors: Sriram Srinivasan, Eindhoven (NL); David Antoine Christian Marie Roovers, Eindhoven (NL); Cornelis Pieter Janse, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 258 days.

(21) Appl. No.: 12/997,889

(22) PCT Filed: Jun. 17, 2009

(86) PCT No.: PCT/IB2009/052580
§ 371 (c)(1), (2), (4) Date: Dec. 14, 2010

(87) PCT Pub. No.: WO2009/156906
PCT Pub. Date: Dec. 30, 2009

(65) Prior Publication Data

US 2011/0103625 A1 May 5, 2011

(30) Foreign Application Priority Data

Jun. 25, 2008 (EP) .................................... 08158970

(51) Int. Cl.
*H04R 25/00* (2006.01)
*H04R 3/00* (2006.01)
*H04B 15/00* (2006.01)

(52) U.S. Cl.
USPC .......................................... 381/312; 381/313

(58) Field of Classification Search
USPC ......... 381/92, 94.1, 94.2, 94.3, 313; 704/216, 704/218, 226, 227, 237
See application file for complete search history.

(56) References Cited

U.S. PATENT DOCUMENTS

| | | | | |
|---|---|---|---|---|
| 8,078,456 | B2 * | 12/2011 | Chen et al. | 704/218 |
| 8,150,683 | B2 * | 4/2012 | Padhi et al. | 704/216 |
| 8,194,872 | B2 * | 6/2012 | Buck et al. | 381/71.11 |
| 2004/0190730 | A1 | 9/2004 | Rui et al. | |
| 2007/0237346 | A1 * | 10/2007 | Fichtl et al. | 381/314 |

FOREIGN PATENT DOCUMENTS

| | | | |
|---|---|---|---|
| WO | 9927522 | A2 | 6/1999 |

* cited by examiner

*Primary Examiner* — Brian Ensey
*Assistant Examiner* — Norman Yu

(57) ABSTRACT

An audio processing arrangement (200) comprises a plurality of audio sources (101, 102) generating input audio signals, a processing circuit (110) for deriving processed audio signals from the input audio signals, a combining circuit (120) for deriving a combined audio signal from the processed audio signals, and a control circuit (130) for controlling the processing circuit in order to maximize a power measure of the combined audio signal and for limiting a function of gains of the processed audio signals to a predetermined value. In accordance with the present invention, the audio processing arrangement (200) comprises a pre-processing circuit (140) for deriving pre-processed audio signals from the input audio signals to minimize a cross-correlation of interferences comprised in the input audio signals. The pre-processed signals are provided to the processing circuit (110) instead of the input audio signals.

20 Claims, 4 Drawing Sheets

AUDIO PROCESSING

FIELD OF INVENTION

The invention relates to an audio processing arrangement comprising a plurality of audio sources for generating input audio signals, a processing circuit for deriving processed audio signals from the input audio signals, a combining circuit for deriving a combined audio signal from the processed audio signals, and a control circuit for controlling the processing circuit in order to maximize a power measure of the combined audio signal, and for limiting a function of gains of the processed audio signals to a predetermined value. The invention also relates to an audio processing method.

BACKGROUND OF THE INVENTION

Advanced processing of audio signals has become increasingly important in many areas including e.g. telecommunication, content distribution etc. For example, in some applications, such as teleconferencing, complex processing of inputs from a plurality of microphones has been used to provide a configurable directional sensitivity for the microphone array comprising the microphones. Specifically, the processing of signals from a microphone array can generate an audio beam with a direction that can be changed simply by changing the characteristics of the combination of the individual microphone signals.

Typically, beam form systems are controlled such that the attenuation of interferers is maximized. For example, a beam forming system can be controlled to provide a maximum attenuation (preferably a null) in the direction of a signal received from a main interferer.

A beam form system which provides particularly advantageous performance in many embodiments, is the Filtered-Sum Beamformer (FSB) disclosed in WO 99/27522.

In contrast to many other beam forming systems, the FSB system seeks to maximize the sensitivity of the microphone array towards a desired signal rather than to maximize attenuation towards an interferer. An example, of the FSB system is illustrated in FIG. 1.

The FSB system seeks to identify characteristics of the acoustic impulse responses from a desired source to an array of microphones, including the direct field and the first reflections. The FSB creates an enhanced output signal, z, by adding the desired part of the microphone signals coherently by filtering the received signals in forward matching filters and adding the filtered outputs. Also, the output signal is filtered in backward adaptive filters having conjugate filter responses to the forward filters (in the frequency domain corresponding to time inversed impulse responses in the time domain). Error signals are generated as the difference between the input signals and the outputs of the backward adaptive filters, and the coefficients of the filters are adapted to minimize the error signals thereby resulting in the audio beam being steered towards the dominant signal. The generated error signals can be considered as noise reference signals which are particularly suitable for performing additional noise reduction on the enhanced output signal z.

A particularly important area for audio signal processing is in the field of hearing aids. In recent years, hearing aids have increasingly applied complex audio processing algorithms to provide an improved user experience and assistance to the user. For example, audio processing algorithms have been used to provide an improved signal to noise ratio between a desired sound source and an interfering sound source resulting in a clearer and more perceptible signal being provided to the user. In particular, hearing aids have been developed which include more than one microphone with the audio signals of the microphones being dynamically combined to provide directivity for the microphone arrangement. As another example, noise canceling system may be applied to reduce the interference caused by undesired sound sources and background noise.

The FSB system promises to be advantageous for applications such as hearing aids as it promises an efficient beam forming towards a desired signal (rather than being directed to attenuation of interfering signals). This has been found to be of particular advantage in hearing aid applications where it has been found to provide a signal to the user which facilitates and aids the perception of the desired signal. In addition, the FSB system provides a noise reference signal which is particularly suitable for noise reduction/compensation for the generated signal.

However, it has been found that the FSB system has some associated disadvantages when used in applications such as for a hearing aid. In particular, it has been found that for low distances between the microphones of the microphone array, the performance of the FSB system degrades. For example, for a typically hearing aid configuration of an end-fire array with two omni-directional microphones with a spacing of 15 mm, the FSB has been found to have suboptimal performance. Indeed, it has been found that in many scenarios, the FSB system has not been able to converge towards the desired signal.

Hence, an improved audio beam forming would be advantageous and in particular a beam forming allowing improved suitability for hearing aids for which distance between microphones is rather small.

SUMMARY OF THE INVENTION

It is an object of the present invention to provide an enhanced audio processing arrangement which is suitable for low distances between the microphones of the microphone array. The invention is defined by the independent claims. The dependent claims define advantageous embodiments.

This object is achieved according to the present invention in an audio processing arrangement as stated above and characterized in that the audio processing arrangement comprises a pre-processing circuit for deriving pre-processed audio signals from the input audio signals. The pre-processed signals are provided to the processing circuit instead of the input audio signals. The pre-processing circuit is arranged for minimizing a cross-correlation of interferences comprised in the input audio signals.

In an embodiment, the pre-processing circuit guarantees that only the power of a desired signal in the output signal is maximized in case the interference comprised in one input audio signal is correlated with the interference comprised in the other input audio signals. Without pre-processing circuit and with the processing circuit and the control circuit using e.g. adaptive filter coefficients that are configured to maximize the desired output power in the combined audio signal, the error signals of the adaptive filters comprised in the processing circuit and the control circuit contain interferences that are correlated with the input of the adaptive filters, in case the interferences in the audio signals are correlated. This will result in divergence of adaptive filter coefficients from the optimal solution. Here the divergence means that maximizing the output power of the combined signal does not result in maximizing the output power of the desired signal.

In an embodiment, the pre-processing performed in the pre-processing circuit ensures that, with e.g. adaptive filter coefficients as used by the processing circuit and the control circuit that are configured to maximize the desired output power in the combined audio signal, the correlation between the interference component in the error signal and the input of the adaptive filter is minimized.

In this way the audio processing arrangement provides a robust performance when applied to microphone arrays with correlated interferences. One example of such a situation is a small microphone array in end-fire configuration in reverberant conditions.

In an embodiment, the pre-processing circuit minimizes a cross-correlation of the interferences by circuit of multiplication of input audio signals by an inverse of a regulation matrix. The regulation matrix is a function of a correlation matrix, wherein entries of the correlation matrix are correlation measures between respective pairs of plurality of interferences, contained in the audio sources.

The divergence of e.g. the adaptive filters comprised in the processing circuit and the control circuit, respectively, from the situation where the adaptive filters are converged to the desired speech signal is caused by correlation of the interferences in the audio signals, in particular caused by the correlation of the interferences in the error signal of the adaptive filters and the input of the adaptive filters. Here the convergence to the desired signal circuit that the adaptive filter coefficients are configured to maximize the desired output power in the combined audio signal. Multiplication of the input audio signals by an inverse of the regulation matrix ensures that the correlation between the interferences in the error signal and the input of the adaptive filter is minimized.

In a further embodiment, the regulation matrix is the correlation matrix. Entries of the correlation matrix can be scalars or filters. When the entries are scalars, then it is advantageous to treat problem in the time domain. If the entries are filters, then it is advantageous to treat the problem in the frequency domain. In the frequency domain, for each frequency component ω, the correlation matrix Γ(ω) has scalar entries, and thus the scalar case can be applied for each individual frequency component.

In a further embodiment, the regulation matrix is given by:

$$\Gamma_{reg}(\omega)=\eta\Gamma(\omega)+(1-\eta)I$$

wherein $\Gamma_{reg}(\omega)$ is the regulation matrix, Γ(ω) is the correlation matrix, η is a predetermined parameter, and I is an identity matrix, and ω is a radial frequency.

The advantage of the above choice of the regulation matrix is that the operation of the audio processing arrangement is made less sensitive to un-correlated noise such as e.g. microphone self noise.

In a further embodiment, the parameter η is given by:

$$\eta=\frac{\sigma_v^2}{\sigma_v^2+\sigma_n^2}$$

wherein $\sigma_v^2$ is a variance of the correlated interference in the input audio signals (either acoustic noise and/or reverberation of the desired speech signal), and $\sigma_n^2$ the variance of the uncorrelated electronic noise (white noise, e.g. microphone self-noise) contained in the audio signals.

$\Gamma_{reg}(\omega)$ is equivalent to the data correlation matrix of the combined interference signal including correlated interferences and non-correlated electronic interferences. With such definition of the parameter η, the entries of the regulation matrix more precisely reflect the actual correlation between the interferences.

In a further embodiment, the parameter η takes on a predetermined fixed value. With the pre-determined fixed value of η it is not necessary to measure the values of $\sigma_v^2$ and $\sigma_n^2$, but an average value for η can be taken, leading to reducing the correlation. The advantage of this embodiment is that the determining the entries of the regulation matrix is very simple. The parameter η is treated as a design parameter that controls the trade-off between robustness to diffuse noise and amplification of microphone self-noise. A typical value of the parameter η is 0.99.

In a further embodiment, the (p,q) entry of the regulation matrix is given by:

$$\Gamma_{regpq}(\omega)=\frac{E\{V_p^*(\omega)V_q(\omega)\}}{\sqrt{E\{V_p^*(\omega)V_p(\omega)\}E\{V_q^*(\omega)V_p(\omega)\}}}$$

wherein $V_p(\omega)$ is the interference in the input audio signal p, $V_q(\omega)$ the interference in the input audio signal q, ω a radial frequency, and E is the expectation operator. The advantage of the above embodiment is that the entries of the regulation matrix are quite accurate.

In a further embodiment, the (p,q) entry of the correlation matrix is given by:

$$\Gamma_{pq}(\omega)=\mathrm{sinc}\left(\omega\frac{d_{pq}}{c}\right)$$

wherein $d_{pq}$ is a distance between microphones p and q, c is a speed of sound in air, and ω is a radial frequency. The Γ matrix is the data correlation matrix that belongs to a (perfect) diffuse sound field. The diffuse sound field can be either a diffuse noise field, or the field due to reverberation of the desired speech. Especially for the latter it is difficult to measure the data correlation matrix, since the reverberation is connected to the desired (direct) speech, i.e. it is not available during non-speech activity. The above formula provides a good estimate of the coherence function in diffuse noise fields.

In a further embodiment, the processing circuit comprises a plurality of adjustable filters for deriving the processed audio signals from the pre-processed audio signals, and the control circuit comprises a plurality of further adjustable filters having a transfer function being a conjugate of a transfer function of the adjustable filters. The further adjustable filters derive filtered combined audio signals from the combined audio signals. The control circuit limits a function of gains of the processed audio signals to the predetermined value by controlling the transfer functions of the adjustable filters and the further adjustable filters in order to minimize a difference measure between the input audio signals and the filtered combined audio signal corresponding to the input audio signals.

By using adjustable filters as processing circuit the quality of speech signal can be further enhanced. By minimizing a difference measure between the input audio signal and the corresponding filtered combined audio signal, it is obtained that a power measure of the combined audio signal is maximized under the constraint that per frequency component a function of the gains of the adjustable filters is equal to a predetermined constant. Or in other words, the control circuit limits implicitly a function of the gains, such that the power of the interference in the output remains constant. Maximizing the power of the output then results in maximizing the power of the desired signal in the output signal, thus enhancing the Signal-to-Noise ratio in the output signal.

Due to a use of adjustable filters no adjustable delay elements such as used in a delay-sum beam former are required.

In a further embodiment, the audio processing arrangement comprises fixed delay elements to compensate a delay difference of a common audio signal present in the input audio signals. The audio signal from a sound source might arrive at different times to the audio sources, therefore causing a delay between input audio signals generated by these audio sources. These differences are compensated by the delay elements.

According to another aspect of the invention there is provided an audio processing method. It should be appreciated that the features, advantages, comments etc described above are equally applicable to this aspect of the invention.

The invention further provides an audio signal processing arrangement, and a hearing aid comprising the audio signal processing arrangement according to the invention.

These and other aspects, features and advantages of the invention will be apparent from and elucidated with reference to the embodiment(s) described hereinafter.

BRIEF DESCRIPTION OF THE DRAWINGS

Throughout the figures, same reference numerals indicate similar or corresponding features. Some of the features indicated in the drawings are typically implemented in software, and as such represent software entities, such as software modules or objects.

DETAILED DESCRIPTION OF THE EMBODIMENTS

The following description focuses on embodiments of the invention applicable to a hearing aid and in particular to a hearing aid comprising two audio sources. The audio sources may be microphones. The microphones are preferably omnidirectional. However, it will be appreciated that the invention is not limited to this application but may be applied to many other audio applications. In particular, it will be appreciated that the described principles may readily be extended to embodiments based on more than two audio sources.

Figure 1:
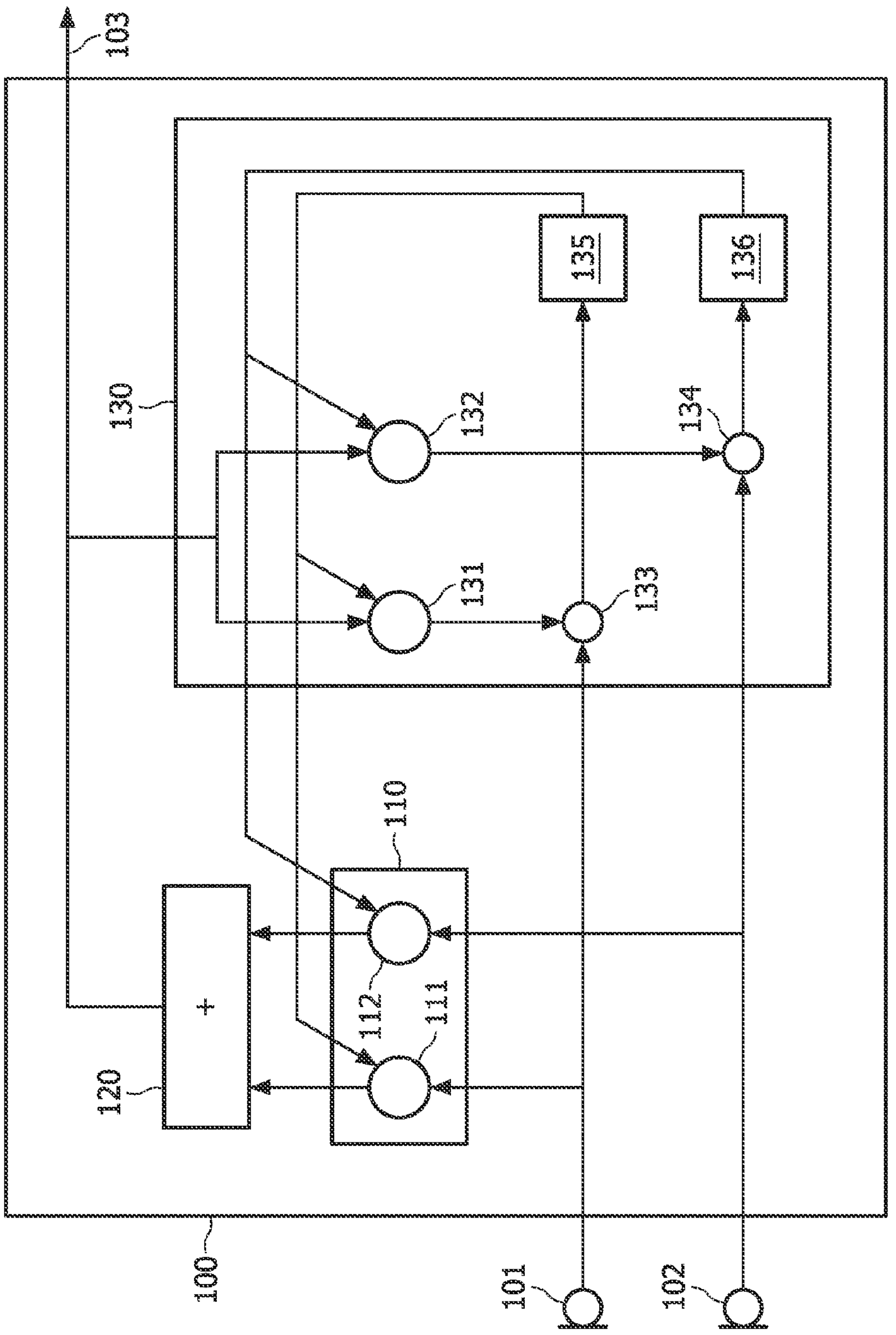
FIG. 1 shows an illustration of a prior art audio processing arrangement capable of beam forming.

FIG. 1 shows an illustration of a prior art audio processing arrangement capable of beam forming, such as disclosed in WO 99/27522. The audio processing arrangement adapts an audio beam towards a desired sound source which may be a speaker with whom the user of the hearing aid is currently talking. In the specific example, the hearing aid comprises an audio processing arrangement 100 as shown in FIG. 1. The FSB as used by the audio processing arrangement 100 maximizes the power of the desired sound source, e.g. speech, even if uncorrelated noise is present.

An output of the first audio source 101, being here a microphone 101, is connected to a first input of the audio processing arrangement 100 and an output of second audio source, being here a microphone 102, is connected to a second input of the audio processing arrangement 100.

A first input audio signal $x_1$, and a second input audio signal $x_2$:

$$x_1=as+n_1,$$

$$x_2=s+n_2,$$

generated by the audio sources 101 and 102, respectively, are processed by the audio processing arrangement to generate an audio beam form 103. Here, s is a desired sound source (e.g. speech), a to which we refer as the transfer factor is a constant, and $n_1$ and $n_2$ are uncorrelated noise interferences. Furthermore it is assumed that:

$$E\{n_1^2\}=E\{n_2^2\}=1, \text{ and}$$

$$E\{n_1n_2\}=E\{_1s\}=E\{n_2s\}=0.$$

This means that $n_1$ and $n_2$ are uncorrelated with each other, have unit variance, and are uncorrelated with the desired sound source s.

The processing circuit 110 comprises a first scaling circuit 111 and a second scaling circuit 112, each scaling circuit scaling its input audio signal with a predetermined scaling factor. The first scaling circuit is using scaling factor $f_1$. The second scaling circuit is using scaling factor $f_2$. The first scaling circuit generates a first processed audio signal. The second scaling circuit generates a second processed audio signal.

The first and second processed signals are then summed in a combining circuit 120 to generate a combined (directional) audio signal 103:

$$\begin{aligned} y &= x_1 f_1 + x_2 f_2 \\ &= (as + n_1) f_1 + (s + n_2) f_2. \end{aligned}$$

Specifically, by modifying the scaling factors of the first and second scaling circuits 111 and 112, the direction of an audio beam can be directed in a desired direction.

The scaling factors are updated such that a power estimate for the entire combined audio signal is maximized. The adaptation of the scaling factors are furthermore made with a constraint that the summed energy of the scaling circuits 111 and 112 is maintained constant.

The result of the above is that the scaling factors are updated such that a power measure for a desired source component of the combined audio signal is maximized, even though the combined signal contains uncorrelated noise.

In the specific example, the scaling factors of circuits 111 and 112 are not updated directly. Instead, the audio processing arrangement 100 comprises a control circuit 130 which determines the values of the scaling factors to be used by the processing circuit 110. The control circuit comprises further scaling circuits 131 and 132 for scaling the combined audio signal to generate a third processed audio signal and a fourth processed audio signal, respectively.

The third processed audio signal is fed to a first subtraction circuit 133 which generates a first residual signal between the third processed audio signal and the first input audio signal $x_1$. The fourth processed audio signal is fed to a second subtraction circuit 134 which generates a second residual signal between the fourth processed audio signal and the second input audio signal $x_2$.

In the arrangement, the scaling factors of the further scaling circuit 131 and 132 are adapted by control elements 135 and 136, respectively, in the presence of a dominant signal from the desired sound source such that the powers of the residual signals are reduced and specifically minimized. Below the operation of the control circuit is explained in more detail.

The power of the combined audio signal 103 is:

$$\begin{aligned} P_y &= E\{y^2\} \\ &= (a^2 f_1^2 + 2af_1f_2 + f_2^2)s^2 + f_1^2 E\{n_1^2\} + f_2^2 E\{n_2^2\} \\ &= (a^2 f_1^2 + 2af_1f_2 + f_2^2)s^2 + f_1^2 + f_2^2. \end{aligned}$$

When $P_y$ is maximized under the constraint $f_1^2+f_2^2=1$ the power of the noise in $P_y$ remains constant and the Signal-to-Noise ratio in $P_y$ is maximized. The scaling factors can be then calculated theoretically using a Lagrange multiplier method, which yields:

$$f_1 = \frac{\pm a}{\sqrt{a^2+1}} \text{ and } f_2 = \frac{\pm 1}{\sqrt{a^2+1}}.$$

In practice however, the scaling factors are obtained preferably using a least-mean-squares (LMS) adaptation scheme, as is done in the control elements 135 and 136. The Lagrange multipliers method as such is used for theoretical calculation. For $f_1$ and $f_2$ chosen as:

$$f_1 = \frac{a}{\sqrt{a^2+1}} \text{ and } f_2 = \frac{1}{\sqrt{a^2+1}},$$

the scaling factors are applied in the audio processing arrangement 100 in circuit 111, 131, and 112, 132, respectively. In other words the scaling factor used by the scaling circuit 111 is the same as this used by the further scaling circuit 131. It can be shown that for the first scaling circuit 111 there is no remaining desired sound signal s in its residual signal and that the cross-correlation between the residual signal and the input of the first scaling circuit 111 is zero, in case:

$$f_1 = \frac{a}{\sqrt{a^2+1}} \text{ and } f_2 = \frac{1}{\sqrt{a^2+1}}.$$

The combined audio signal fed into the control circuit 130 is expressed as:

$$y=f_1(as+n_1)+f_2(s+n_2).$$

The first residual signal $r_1$ is then expressed as:

$$r_1=as+n_1-f_1^2(as+n_1)-f_1f_2(s+n_2).$$

For $$f_1 = \frac{a}{\sqrt{a^2+1}} \text{ and } f_2 = \frac{1}{\sqrt{a^2+1}} \text{ and } f_1^2 + f_2^2 = 1$$

the above first residual signal reduces to:

$$r_1 = -f_1^2 n_1 - f_1 f_2 n_2 + n_1 = f_2^2 n_1 - f_1 f_2 n_2.$$

The cross-correlation between y and $r_1$ gives then:

$$E\{yr_1\}=f_1f_2^2E\{n_1^2\}-f_1f_2^2E\{n_2^2\}=0.$$

At equilibrium there is no desired sound signal in the reference signal and $E\{yr_1\}$ due to the noise is zero.

The control elements 135 and 136 are preferably updated according to the expressions:

$$f_1(k+1)=f_1(k)+\mu y(k)r_1(k)$$

and $$f_2(k+1)=f_2(k)+\mu y(k)r_2(k)$$

respectively, where k is a time index, $r_2$ is the second residual signal and where μ is an adaptation constant. Since $E\{y\ r_1\}$ due to the noise is zero in case $$f_1 = \frac{a}{\sqrt{a^2+1}} \text{ and } f_2 = \frac{1}{\sqrt{a^2+1}}, f_1$$

will remain at equilibrium. The same holds for $f_2$.

The above can easily be generalized for N input audio signals each having a transfer factor $a_i$ with $1 \leqq i \leqq N$. For N scaling circuits comprised in the processing circuit 110 each corresponding to an input audio signal i the scale factors for each of the scaling circuits can be expressed as:

$$f_i = \frac{\pm a_i}{\sqrt{\sum_{j=1}^{N} a_j^2}}.$$

The inventors have realized that the performance of the described audio processing arrangement 100 is significantly degraded in the presence of correlated noise and therefore is unsuitable for many applications where closely spaced microphones are used resulting in increased correlated noise, such as reverberation noise. Specifically, the inventors have realized that the presence of correlated noise may result in the algorithm converging towards suboptimal scaling factors corresponding to suboptimal beam forms/directions or may result in the algorithm not converging. Thus, as realized by the inventors, for an input signal comprising a desired signal component, an uncorrelated noise component and a correlated noise component, the uncorrelated noise component will merely increase the variance of the generated filter coefficient estimates but will not introduce a bias to the estimates whereas the correlated noise will tend to bias the adaptation away from the correct values of the filter coefficients. Specifically, it has been found that for a small microphone array in a reverberant room, the reverberation may completely prevent the beam forming unit 100 from converging towards the correct solution. This is especially the case if the level of the reverberation is equal to, or larger than, the direct sound including early reflections, i.e. if the distance between the source and the microphones exceeds the reverberation radius. Of course, such a situation is typically the case for hearing aid applications wherein the distance between the microphones is low whereas the distance to the desired sound source (e.g. a speaker) is much larger.

Figure 2:
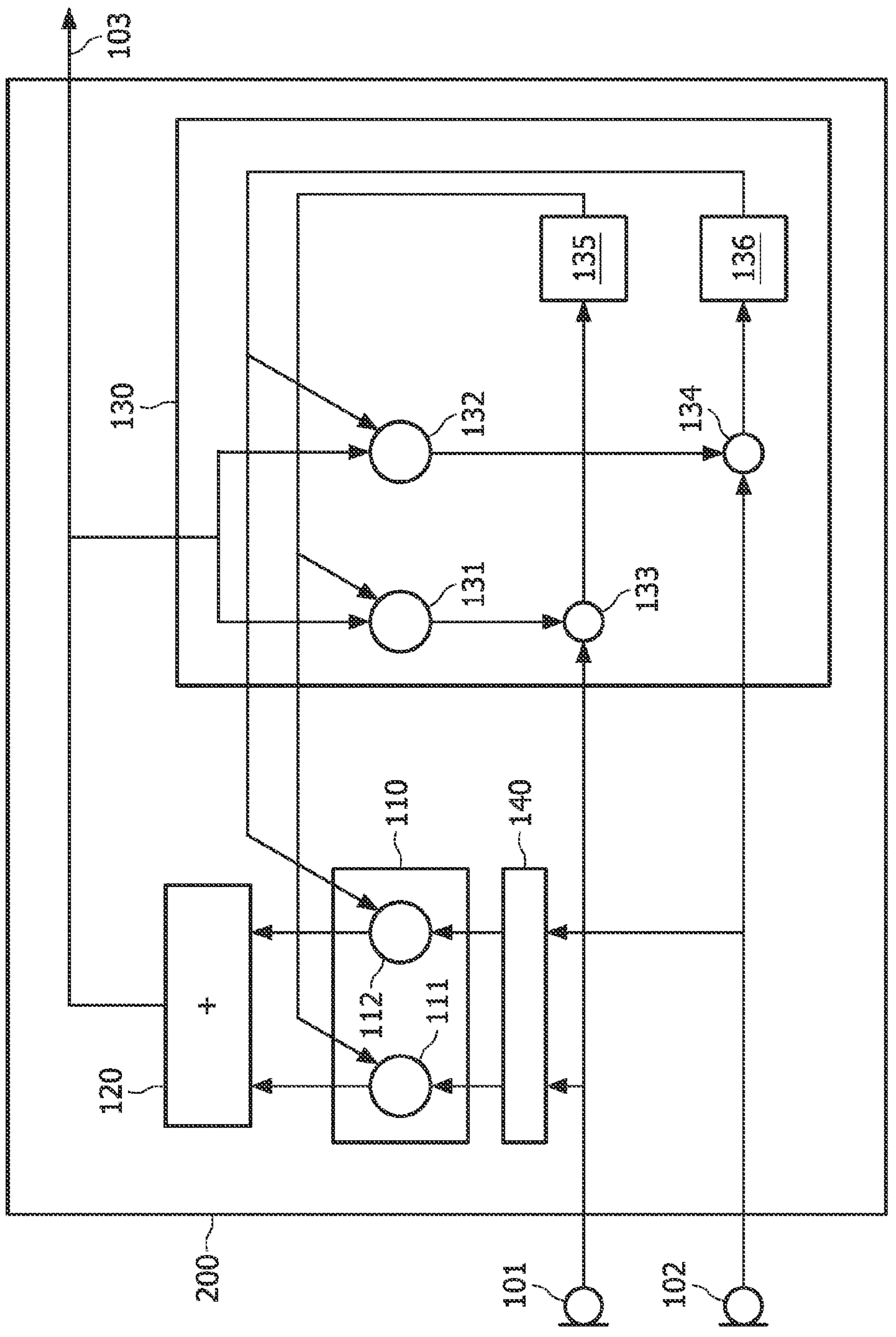
FIG. 2 shows an illustration of an example of an audio processing arrangement in accordance with some embodiments of the invention.

FIG. 2 shows an illustration of an audio processing arrangement 200 in accordance with an embodiment of the invention. The audio processing arrangement 200 is the audio processing arrangement 100 extended by the pre-processing circuit 140. The pre-processing circuit 140 derives pre-processed audio signals from the input audio signals. The pre-processed signals are provided to the processing circuit instead of the input audio signals. The pre-processing circuit 140 is arranged for minimizing a cross-correlation of interferences comprised in the input audio signals.

The operation of the pre-processing circuit 140 is explained on an example. There is a non-zero cross-correlation between $n_1$ and $n_2$:

$$E\{n_1 n_2\}=\rho.$$

The power of the combined audio signal 103 is now:

$$\begin{aligned} P_y &= E\{y^2\} \\ &= (a^2 f_1^2 + 2af_1 f_2 + f_2^2)s^2 + f_1^2 E\{n_1^2\} + f_2^2 E\{n_2^2\} + 2f_1 f_2 E\{n_1 n_2\} \\ &= (a^2 f_1^2 + 2af_1 f_2 + f_2^2)s^2 + f_1^2 + f_2^2 + 2\rho f_1 f_2. \end{aligned}$$

With $f_1^2+f_2^2=1$, it is clear that maximizing $P_y$ does not necessarily mean that the Signal-to-Noise ratio is maximized. For $\rho \gg s^2$, maximizing $P_y$ maximizes $2\rho f_1 f_2$ with $$f_1 = f_2 = \frac{1}{2}\sqrt{2},$$

which is not the correct solution except when a=1.

In the control circuit 130 the expression $f_1^2+f_2^2=1$ is optimized and a problem arises for the residual $r_1$ for the case $$f_1 = \frac{a}{\sqrt{a^2+1}} \text{ and } f_2 = \frac{1}{\sqrt{a^2+1}},$$

as the expectation $E\{y\, r_1\}$ is then:

$$\begin{aligned} E\{yr_1\} &= f_1 f_2^2 E\{n_1^2\} - f_1 f_2^2 E\{n_2^2\} - (f_1^2 f_2 - f_2^3)E\{n_1 n_2\} \\ &= 0 - \frac{\rho(a^2-1)}{(a^2+1)\sqrt{a^2+1}}. \end{aligned}$$

Thus $E\{y\, r_1\}$ has a non-zero value when ≠1. As a result, due to the update rule of the scaling factors used in the control element 135

$$f_1 = \frac{a}{\sqrt{a^2+1}}$$

is not equilibrium and $f_1$ will converge to a different (undesired) solution.

It is thus desired to remove the influence of the cross-correlation of the interferences, as it is done in the pre-processing circuit 140. The data correlation matrix for the above example is defined as:

$$\Gamma = \begin{bmatrix} 1 & \rho \\ \rho & 1 \end{bmatrix}$$

with its inverse being:

$$\Gamma^{-1} = \frac{1}{1-\rho^2}\begin{bmatrix} 1 & -\rho \\ -\rho & 1 \end{bmatrix}.$$

The pre-processed signals at the output of the pre-processing circuit 140 are then given by:

$$\frac{1}{1-\rho^2}\begin{bmatrix} 1 & -\rho \\ -\rho & 1 \end{bmatrix}\begin{bmatrix} as+n_1 \\ s+n_2 \end{bmatrix} = \frac{1}{1-\rho^2}\begin{bmatrix} (a-\rho)s + n_1 - \rho n_2 \\ (-a\rho+1)s - \rho n_1 + n_2 \end{bmatrix}.$$

The combined signal y at the output of the combining circuit 120 is then:

$$y = \frac{1}{1-\rho^2}(f_1(a-\rho) + f_2(1-a\rho)s + n_1(f_1 - \rho f_2) + n_2(f_2 - \rho f_1)).$$

The power of y is then:

$$\begin{aligned} P_y &= \frac{1}{(1-\rho^2)^2}(f_1(a-\rho) + f_2(1-a\rho))^2 s^2 + \\ &\quad \frac{1}{1-\rho^2}(f_1^2 E\{n_1^2\} - 2f_1 f_2 E\{n_1 n_2\} + f_2^2 E\{n_2^2\}) \\ &= \frac{1}{(1-\rho^2)^2}(f_1(a-\rho) + f_2(1-a\rho))^2 s^2 + \\ &\quad \frac{1}{1-\rho^2}(f_1^2 - 2f_1 f_2 + f_2^2) \end{aligned}$$

To optimize the Signal-to-Noise ratio a constraint must be applied that keeps the noise contribution in $P_y$ independent of $f_1$ and $f_2$, i.e.:

$$\frac{1}{1-\rho^2}(f_1^2 - 2f_1 f_2 + f_2^2) = 1,$$

which can be equivalently expressed in matrix notation as $$[f_1 \;\; f_2]\Gamma^{-1}\begin{bmatrix} f_1 \\ f_2 \end{bmatrix} = 1.$$

Applying the Lagrange multiplier method results in the following values for $f_1$ and $f_2$:

$$f_1 = a\sqrt{\frac{1-\rho^2}{a^2 - 2a\rho + 1}} \text{ and } f_2 = \sqrt{\frac{1-\rho^2}{a^2 - 2a\rho + 1}}.$$

The above constraint is implemented in the structure shown in FIG. 2. With the optimal scaling circuit 111 and 112 and further scaling circuit 131 and 132 there is again no desired sound source in the reference signal and the cross-correlation between the noise components in the residual signal and the input of the further scaling circuit equal zero.

The desired sound source component in y is:

$$y_s = \frac{1}{1-\rho^2}(f_1(a-\rho) + f_2(1-a\rho)),$$

and in $r_1$ is:

$$r_s = a - \frac{1}{1-\rho^2}((a-\rho)f_1^2 + (1-a\rho)f_1 f_2) = 0.$$

Similarly for the noise component in y:

$$y_n = \frac{1}{1-\rho^2}(n_1(f_1 - \rho f_2) + n_2(f_2 - \rho f_1)),$$

and in r1:

$$r_n = n_1 - \frac{1}{1-\rho^2}(n_1(f_1^2 - \rho f_1 f_2) - n_2(f_1 f_2 - \rho f_1^2)).$$

Correlating $y_n$ and $r_n$ and inserting the obtained $f_1$ and $f_2$ results in:

$$E\{y_n r_n\}=0.$$

At equilibrium the influence of cross-interferences is removed due to the pre-processing performed in the pre-processing circuit 140.

In an embodiment, the pre-processing circuit 140 minimize a cross-correlation of the interferences by circuit of multiplication of input audio signals by an inverse of a regulation matrix. The regulation matrix is a function of a correlation matrix. Entries of the correlation matrix are correlation measures between respective pairs of plurality of audio sources.

Various choices of the regulation matrix can be made as long as the regulation matrix guarantees that the cross-correlation of interferences comprised in the input audio signals is minimized.

Preferably, the regulation matrix is given by $$\Gamma_{reg\ pq}(\omega) = \frac{E\{V_p^*(\omega)V_q(\omega)\}}{\sqrt{E\{V_p^*(\omega)V_p(\omega)\}E\{V_q^*(\omega)V_p(\omega)\}}}$$

wherein $V_p$ (ω) is the interference in the input audio signal p, $V_q$ (ω) the interference in the input audio signal q, ω a radial frequency, and E is the expectation operator. An example where the regulation matrix can be computed as above is when the interference is from a noise source, and the above matrix can be estimated when the desired sound source is not active. The expectations are calculated by averaging over data samples.

The above approach for computing the regulation matrix is however not possible when the interference is reverberation, as reverberation is present only when the desired source is active and can thus not be measured. In this case, it is possible to make use of a model for the correlation matrix.

In a further embodiment, the regulation matrix is the correlation matrix.

In a further embodiment, the (p,q) entry of the correlation matrix is based on the model for diffuse noise and is given by:

$$\Gamma_{pq}(\omega) = \mathrm{sinc}\left(\omega\frac{d_{pq}}{c}\right)$$

wherein $d_{pq}$ is a distance between microphones p and q, c is a speed of sound in air, and ω is a radial frequency.

If the regulation matrix is the correlation matrix, it de-correlates correlated interferences but previously uncorrelated noise (e.g., white noise, sensor noise) now becomes correlated. Thus there is a trade-off: correlated interferences can be de-correlated, but at the cost of introducing correlation between previously uncorrelated noise. In a further embodiment, the above mentioned trade-off can be controlled by choosing the regulation matrix to be:

$$\Gamma_{reg}(\omega)=\eta\Gamma(\omega)+(1-\eta)I$$

wherein $\Gamma_{reg}(\omega)$ is the regulation matrix, Γ(ω) is the correlation matrix, η is a predetermined parameter, and I is an identity matrix.

A more precise way to control the above mentioned trade-off is to adjust η based on the relative powers of the correlated and uncorrelated noises.

In a further embodiment, the parameter η is given by:

$$\eta = \frac{\sigma_v^2}{\sigma_v^2 + \sigma_n^2}$$

wherein $\sigma_v^2$ is a variance of the interference in the input audio signals, and $\sigma_n^2$ is the variance of an electronic noise contained in the input audio signals.

In a further embodiment, the parameter η takes on a predetermined fixed value. A preferred value for η is 0.98 or 0.99.

Often the power of the electronic noise $\sigma_n^2$ is fixed and can be measured. The quantity $\sigma_v^2+\sigma_n^2$ can also be measured when the desired source is not active. Once these two quantities are known, the parameter η can be computed.

Figure 3:
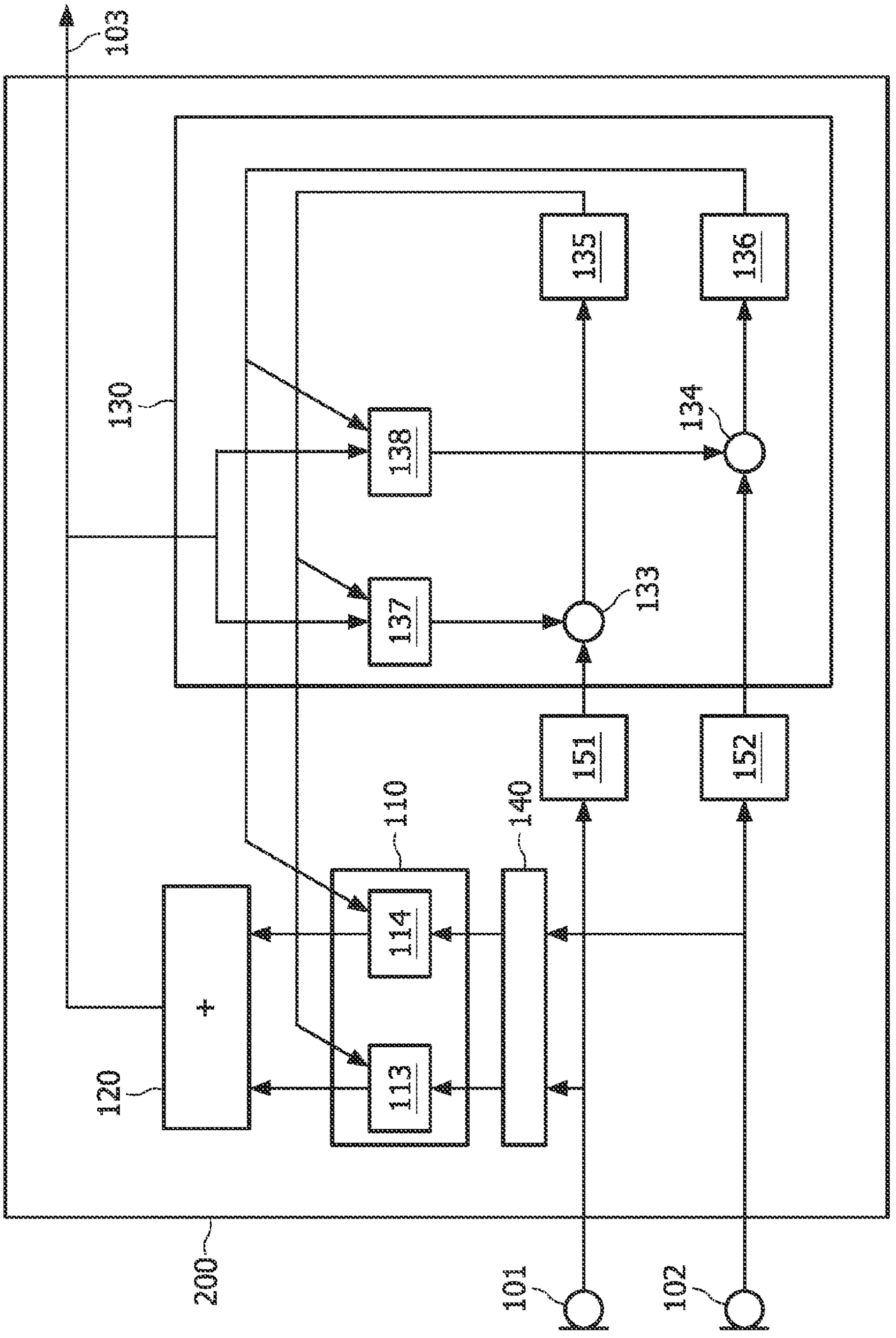
FIG. 3 shows an illustration of an example of an audio processing arrangement according to some embodiments of the invention with the processing circuit and the control circuit comprising a plurality of adjustable filters.

FIG. 3 shows an illustration of an audio processing arrangement 200 according to an embodiment of the invention. The processing circuit 140 comprises a plurality of adjustable filters 113 and 114 for deriving the processed audio signals from the pre-processed audio signals. The control circuit 130 comprises a plurality of adjustable filters 137 and 138 having transfer function being a conjugate of a transfer function of the adjustable filters. The adjustable filters 137 and 138 are arranged for deriving filtered combined audio signals from the combined audio signals. The control circuit 130 is arranged for limiting a function of gains of the processed audio signals to the predetermined value by controlling the transfer functions of the adjustable filters and the further adjustable filters in order to minimize a difference measure between the input audio signals and the filtered combined audio signal corresponding to the input audio signals.

Further the audio processing arrangement 200 comprises fixed delay elements 151 and 152. The output of the first audio source 101 is connected to the input of the first delay element 151. The output of the first delay element 151 is connected to the first input of the subtraction circuit 133. The output of the second audio source 102 is connected to the input of the second delay element 152. The output of the second delay element 152 is connected to the second subtraction circuit 134. The delay elements 151 and 152 make the impulse response of the adjustable filters relatively anti-causal (earlier in time) with respect to the impulse response of the further adjustable filters.

In the case when there are adjustable filters instead of scalar (gain) factors as in the example considered previously, it is advantageous to look at the problem in the frequency domain. Similar to the example considered earlier, one then has in the frequency domain a first input audio signal $x_1(\omega)$, and a second input audio signal $x_2(\omega)$ expressed as:

$$x_1(\omega)=a(\omega)s(\omega)+n_1(\omega),$$

$$x_2(\omega)=s(\omega)+n_2(\omega).$$

The above system can be treated as a scalar case for each frequency component ($\omega$), and corresponding gain factors $f_1(\omega)$ and $f_2(\omega)$ can be derived as in the earlier example. The quantities $f_1(\omega)$ and $f_2(\omega)$ correspond to the transfer functions of the adjustable filters.

Figure 4:
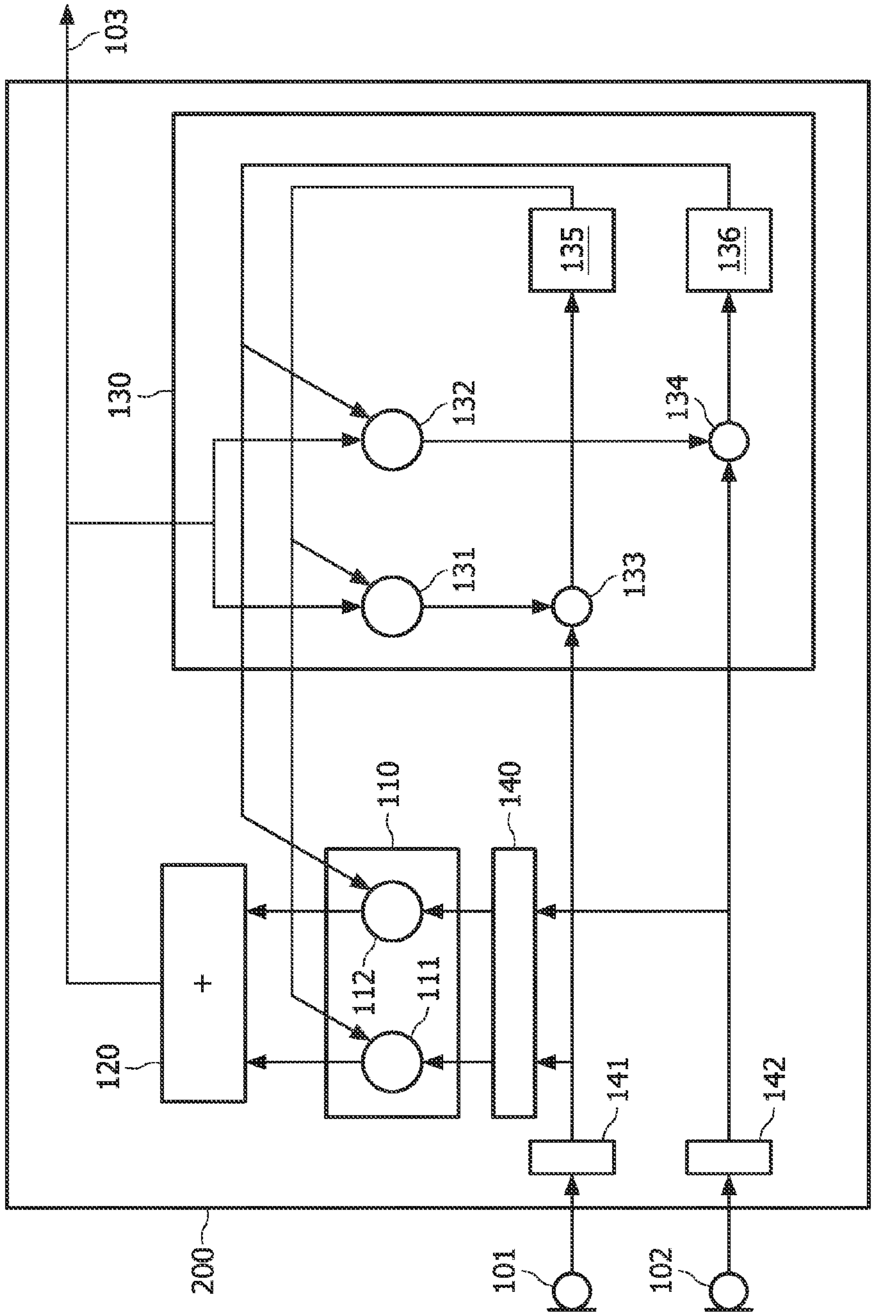
FIG. 4 shows an illustration of an example of an audio processing arrangement according to some embodiments of the invention with delay elements.

FIG. 4 shows an illustration of an audio processing arrangement 200 according to an embodiment of the invention with delay elements 141, 142. The delay elements compensate a delay difference of a common audio signal present in the input audio signals. The audio signal from a desired (physical) sound source might arrive at different times to the audio sources 101 and 102, therefore causing a delay between input audio signals generated by these audio sources. These differences are compensated by the delay elements 141 and 142. The audio processing arrangement 200 as shown on FIG. 4 gives therefore an improved performance, also during transition periods in which the delay value of the delay elements to compensate the path delays are not yet adjusted to their optimum value.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of circuits, elements or method steps may be implemented by e.g. a single unit or suitably programmed processor. Additionally, although individual features may be included in different claims, these may be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example and shall not be construed as limiting the scope of the claims in any way.

The invention claimed is:

1. An audio processing arrangement comprising:

a pre-processing circuit for deriving pre-processed audio signals from the input audio signals to minimize a cross-correlation of interferences comprised in input audio signals; wherein the pre-processing circuit is arranged to minimize the cross-correlation of interferences by multiplication of the input audio signals by an inverse of a regulation matrix, wherein the regulation matrix guarantees that the cross-correlation of interferences is minimized;

a processing circuit for deriving processed audio signals from the pre-processed input audio signals;

a combining circuit for deriving a combined audio signal from the processed audio signals; and a control circuit for controlling the processing circuit to maximize a power measure of the combined audio signal, and for limiting a function of gains of the processed audio signals to a predetermined value.

2. An audio processing arrangement comprising:

a pre-processing circuit for deriving pre-processed audio signals from the input audio signals to minimize a cross-correlation of interferences comprised in input audio signals;

a processing circuit for deriving processed audio signals from the pre-processed input audio signals;

a combining circuit for deriving a combined audio signal from the processed audio signals; and a control circuit for controlling the processing circuit to maximize a power measure of the combined audio signal, and for limiting a function of gains of the processed audio signals to a predetermined value, wherein the pre-processing circuit is arranged to minimize a cross-correlation of the interferences by multiplication of input audio signals by an inverse of a regulation matrix, wherein the regulation matrix is a function of a correlation matrix, and wherein entries of the correlation matrix are correlation measures between respective pairs of plurality of audio sources.

3. The audio processing arrangement according to claim 2, wherein the regulation matrix is the correlation matrix.

4. The audio processing arrangement according to claim 2, wherein the regulation matrix is given by:

$$\Gamma_{reg}(\omega)=\eta\Gamma(\omega)+(1-\eta)I$$

wherein $\Gamma_{reg}(\omega)$ is the regulation matrix, $\Gamma(\omega)$ is the correlation matrix, $\eta$ is a predetermined parameter, I is an identity matrix, and $\omega$ is a radial frequency.

5. The audio processing arrangement according to claim 4, wherein the parameter $\eta$ is given by:

$$\eta = \frac{\sigma_v^2}{\sigma_v^2 + \sigma_n^2}$$

wherein $\sigma_v^2$ is a variance of the correlated interference in the input audio signals, and $\sigma_n^2$ is the variance of an uncorrelated electronic noise contained in the input audio signals.

6. The audio processing arrangement according to claim 4, wherein the parameter $\eta$ is a predetermined fixed value.

7. The audio processing arrangement according to claim 2, wherein the (p,q) entry of the regulation matrix is given by:

$$\Gamma_{reg\ pq}(\omega)=\frac{E\{V_p^*(\omega)V_q(\omega)\}}{\sqrt{E\{V_p^*(\omega)V_p(\omega)\}E\{V_q^*(\omega)V_p(\omega)\}}}$$

wherein $V_p(\omega)$ is the interference in the input audio signal p, $V_q(\omega)$ is the interference in the input audio signal q, ω is a radial frequency, and E is an expectation operator.

8. The audio processing arrangement according to claim 2, wherein the (p,q) entry of the correlation matrix is given by:

$$\Gamma_{pq}(\omega)=\mathrm{sinc}\left(\omega\frac{d_{pq}}{c}\right)$$

wherein $d_{pq}$ is a distance between microphones p and q, c is a speed of sound in air, and ω is a radial frequency.

9. The audio processing arrangement according to claim 1, wherein the processing circuit comprises a plurality of adjustable filters for deriving the processed audio signals from the pre-processed audio signals, the control circuit comprises a plurality of further adjustable filters for deriving from the combined audio signals filtered combined audio signals, the further adjustable filters having a transfer function being a conjugate of a transfer function of the adjustable filters, and the control circuit is arranged for limiting a function of gains of the processed audio signals to the predetermined value by controlling the transfer functions of the adjustable filters and the further adjustable filters in order to minimize a difference measure between the input audio signals and the filtered combined audio signal corresponding to the input audio signals.

10. The audio processing arrangement according to claim 1, further comprising:

delay elements for compensating a delay difference of a common audio signal present in the input audio signals.

11. An audio signal processing arrangement comprising:

a plurality of audio sources generating input audio signals; and an audio processing arrangement as claimed in claim 1.

12. An audio processing method comprising receiving a plurality of input audio signals from a plurality of audio sources;

deriving pre-processed audio signals from the input audio signals, to minimize a cross-correlation of interferences comprised in the input audio signals, wherein deriving to minimize the cross-correlation of interferences includes multiplication of the input audio signals by an inverse of a regulation matrix, wherein the regulation matrix guarantees that the cross-correlation of interferences is minimized;

deriving processed audio signals from the pre-processed audio signals;

deriving a combined audio signal from the processed audio signals;

controlling the deriving of processed audio signals in order to maximize a power measure of the combined audio signal; and controlling the deriving of processed audio signals for limiting a function of gains of the processed audio signals to a predetermined value.

13. A hearing aid comprising the audio processing arrangement according to claim 11.

14. The audio processing arrangement according to claim 2, wherein the processing circuit comprises a plurality of adjustable filters for deriving the processed audio signals from the pre-processed audio signals, the control circuit comprises a plurality of further adjustable filters for deriving from the combined audio signals filtered combined audio signals, the further adjustable filters having a transfer function being a conjugate of a transfer function of the adjustable filters, and the control circuit is arranged for limiting a function of gains of the processed audio signals to the predetermined value by controlling the transfer functions of the adjustable filters and the further adjustable filters in order to minimize a difference measure between the input audio signals and the filtered combined audio signal corresponding to the input audio signals.

15. The audio processing arrangement according to claim 2, further comprising:

delay elements for compensating a delay difference of a common audio signal present in the input audio signals.

16. An audio signal processing arrangement comprising:

a plurality of audio sources generating input audio signals; and an audio processing arrangement as claimed in claim 2.

17. A hearing aid comprising the audio signal processing arrangement according to claim 16.

18. The audio processing arrangement according to claim 1, wherein the regulation matrix is a correlation matrix.

19. The audio processing arrangement according to claim 1, wherein the regulation matrix is given by:

$$\Gamma_{reg}(\omega)=\eta\Gamma(\omega)+(1-\eta)I$$

wherein $\Gamma_{reg}(\omega)$ is the regulation matrix, $\Gamma(\omega)$ is a correlation matrix, η is a predetermined parameter, I is an identity matrix, and ω is a radial frequency.

20. The audio processing arrangement according to claim 19, wherein the parameter η is given by:

$$\eta=\frac{\sigma_v^2}{\sigma_v^2+\sigma_n^2}$$

wherein $\sigma_v^2$ is a variance of the correlated interference in the input audio signals, and $\sigma_n^2$ is the variance of an uncorrelated electronic noise contained in the input audio signals.

* * * * *